United States Patent [19]

Aghazadeh

[11] 3,852,811

[45] Dec. 3, 1974

[54] DIGITAL DATA ENCODING AND RECONSTRUCTION CIRCUIT

[75] Inventor: Shirzad Aghazadeh, Burbank, Calif.

[73] Assignee: The Singer Company, New York, N.Y.

[22] Filed: Apr. 10, 1974

[21] Appl. No.: 459,520

[52] U.S. Cl. .................................................. 360/51

[51] Int. Cl. .................................................. G11b 5/09

[58] Field of Search.............................. 360/41, 51, 40

[56] References Cited

UNITED STATES PATENTS 3,689,903 9/1972 Agrawala ................................ 360/51

*Primary Examiner*—Vincent P. Canney

*Attorney, Agent, or Firm*—Edward L. Bell; Linvol B. Castle; Joseph R. Dwyer

[57] ABSTRACT

A digital, magnetic memory recording and demodulation system which doubles the bit density and thus the capacity of a memory using a phase modulation digital recording method. The normal "double" phase modulation recording signal is divided so that the signal that is recorded on the magnetic medium contains a maximum of only one flux change per bit. The demodulation circuitry then senses the edges of the read-back signal, generates a self-clocking signal by the use of a counter and a decoding matrix having logic gates connected to produce outputs of substantially one-quarter, three-quarters, one and one-quarter, and one and three-quarter bit times, and, by gating the read-back signal with the self-clocking signal, reconstructs the original input data.

4 Claims, 2 Drawing Figures

DIGITAL DATA ENCODING AND RECONSTRUCTION CIRCUIT

CROSS-REFERENCE

Figure 1:
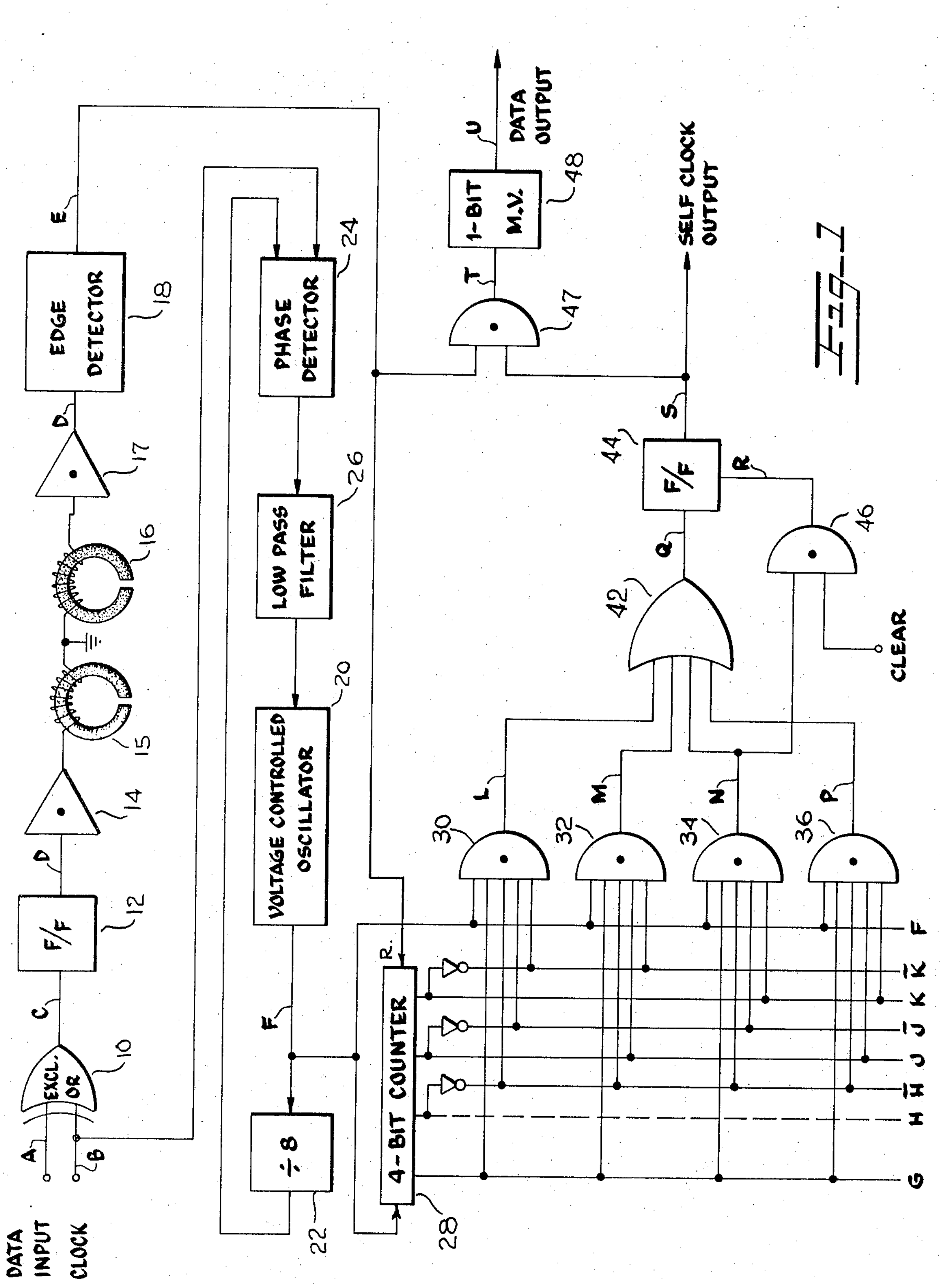

The invention disclosed and claimed herein is for an improvement over the invention disclosed in U.S. Pat. No. 3,699,556, which issued on Oct. 17, 1972, to the inventor of the present invention.

The invention disclosed and claimed in the above referenced patent performs exceedingly well under normal operation conditions. However, under operation conditions which include large variations in input frequency, voltage and temperature it was found that multivibrator circuits, that were used to generate various width pulses, would not compensate for the input changes and temporary errors were produced. The present invention eliminates the source of the errors by the use of a unique generator, counter, and decoding matrix that provides extreme stability, and overcomes the effects of input variations. To obviate the necessity of referring to the referred patent, the background of the invention and much of the detailed description is copied into this specification.

BACKGROUND OF THE INVENTION

All digital computing equipment requires some type of memory storage, and most of the present day computer memories store the data in binary form on moving magnetic mediums, such as a magnetically coated tape, drum, or rotating disc. Because they are unlimited in length, tape memories have a very large storage capacity potential but are considered comparatively slow because of the time required to search for particular data along the length of the tape. Disc and drum memories have very fast access to the data because, as the disc or drum rotates, the data passes under the transducer at each revolution. However, disc or drum memories have a limited capacity depending upon the number of tracks of data, the length of the tracks, and the bit density of recorded data in the tracks. In order to obtain the maximum storage capacity from a given size rotatable memory, it is necessary to select an efficient data recording system.

The simplest magnetic recording method if commonly referred to as the "return to bias" method, which records on the magnetic medium a pulse representing a binary "1" and the lack of a pulse representing a binary "0." Although a simple and inexpensive system, this method of recording is not widely used because the two flux changes required for recording each bit produces a relatively slow recording system and also because the absence of any recording represents a binary "0" and thus may result in readout error.

The possible errors introduced by the lack of a signal being read as a binary "0" is overcome by a recording system referred to as the "return to zero" method of recording, in which a binary "1" is represented by a recorded pulse of one polarity and a binary "0" by a pulse of the opposite polarity. While solving the problem of possible readout error, from lack of signal, this method of recording is relatively slow and not widely used because it is, again, a double transition method requiring two flux changes per recorded bit.

A system which apparently obviates all of the disadvantages referred to above is the "non-return to zero" (NRZ) method, which is fast in that there is a maximum of one flux change per bit, i.e., the transducer current switches only when a binary "1" is recorded. Although very popular, this NRZ method has its disadvantages. Because there is not always an output for each bit sensed by the transducer, the method is not self-clocking and it is, therefore, necessary to record a clock track along with the data tracks. Furthermore, the method is subjected to amplitude dependent time errors, that is, since data is contained only in flux changes, the amplitude of the read-back signal will vary with the data pattern. Another problem of NRZ recording is associated with the existence of high frequency noise at the baseline of the signal in patterns that contain fewer flux changes. The existence of this type of noise increases the error probability and the necessary complexity of the read amplifier design.

Still another method of recording is known as "phase modulation recording" in which the recording current wave form consists of a series of complete cycles, a "1" differing from a "0" only in phase. Although phase modulated signals require a maximum of two flux changes per bit, it is possible to record by this method at a very high rate and at bit densities approaching that of the NRZ method of recording. Furthermore, since there is an output signal for each recorded bit, this system can be made self-clocking and the output information can be correctly interpreted without the necessity of a separately recorded clock signal, as is required in the NRZ method.

The invention disclosed in the referenced patent provided a method and circuitry for doubling the bit density of a phase modulated data signal and, therefore, the memory capacity of a magnetic recording medium. The invention in the referenced patent accomplished this in circuitry that accepts a binary input signal, converts it into a phase modulation double pulse signal, and then modifies that signal into a single pulse signal which may be recorded at high-bit densities. The original input signal is then reconstructed in the demodulation circuitry by first shaping and amplifying the playback signal read by the magnetic transducer, detecting the edges of the shaped signal, and then gating those edges with a self-clocking signal. The invention in the referenced patent, generated the self-clocking signal by detecting the down going edges of the output wave forms produced by a bank of mlutivibrators adjusted to trigger at approximately one-quarter, three-quarters, one and one-quarter, and one and three-quarter-bit times.

This invention improves upon the circuitry of the invention described in the referenced patent by eliminating the bank of multivibrators which, under operation conditions that included large variations in input frequency, voltage and temperature would not compensate for these variations. Errors were therefore produced in the system.

BRIEF DESCRIPTION OF THE INVENTION

Briefly described, the invention is for a digital data demodulation circuit which reconstructs recorded binary data by first shaping and amplifying the play-back signal read by the magnetic transducer, detecting the edges of the shaped signal, and then gating those edges with a self-clocking signal. The self-clocking signal is generated by circuitry including a voltage controller oscillator operating in a phase locked loop at a frequency that is eight times the master clock frequency, a four-bit binary counter operated by the voltage controlled oscillator and reset by pulses representing the edges of the read-back signal, and a decoding matrix coupled to the output of the counter for generating pulses that are substantially one-quarter, three-quarters, one and one-quarter, and one and three-quarters of the master clock bit time.

Figure 2:
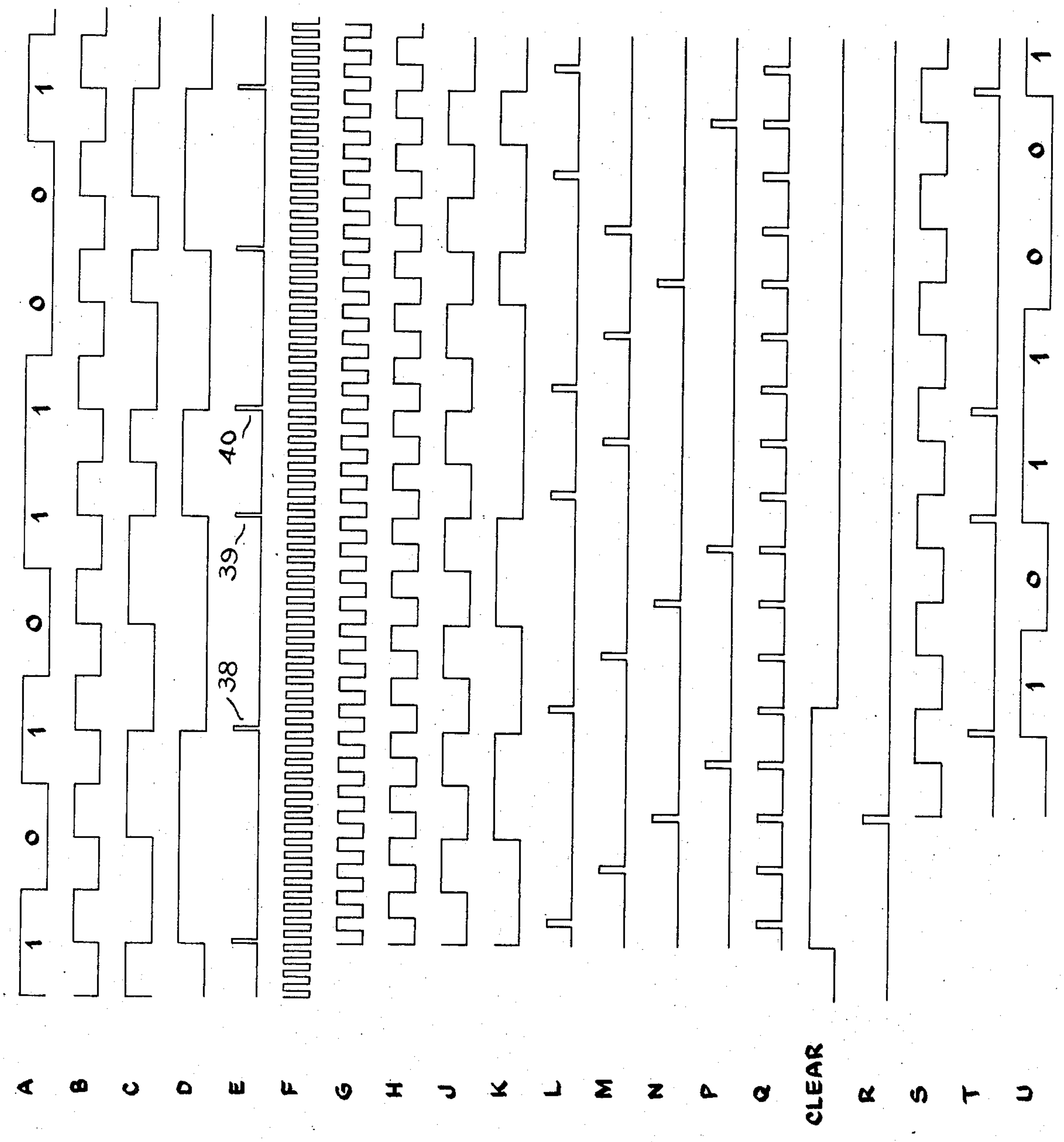

In the drawings which illustrate a preferred embodiment of the invention:

FIG. 1 is a block diagram illustrating the recording and demodulation circuitry of the invention; and FIG. 2 illustrates typical wave forms appearing at various points in the block diagram circuitry illustrated in FIG. 1.

It is to be noted that the block diagram of FIG. 1 makes use of capital letters at the output terminals of each block in the diagram. These letters refer to correspondingly identified wave forms in FIG. 2. Therefore, referring to both FIGS. 1 and 2 of the drawings, a binary data input signal A and an externally generated square wave master clock signal B are introduced into an Exclusive OR gate 10, which produces an output signal when there is an input signal at either one, but not both, of its input terminals. It will be noted that in the divided signals shown in wave form D, a binary "1" is represented by one midbit transition; that is, there is a transition when there is a reversal in the clock signal B at the midpoint in any binary "1" signal in the input data wave form A. On the other hand, a binary "0" is represented by the absence of the transition in the case of a single "0," but with a transition at the beginning of each bit between contiguous binary "0's." As shown in curve A of the FIG. 2, the data input to gate 10 is arbitrarily selected as the binary number "101011001." As will subsequently be explained in connection with wave form S generated by the demodulation circuitry, the first two input bits, "1," "0," are considered a preamble to be followed by the actual data bits.

The output signal from Exclusive OR gate 10 is shown in wave form C of FIG. 2 and is the phase modulation representation of the data contained in wave form B. It can be seen in wave form C that a binary "1" is represented by a signal having a high portion followed by a low portion; the binary "0" signal has a low portion followed by a high portion. The phase modulation representation of alternating bits such as "1010" has only one transition per bit which, upon recording, would be one magnetic flux change per bit. However, the phase modulation representation of non-alternating bits, such as "11" or "00" can be seen in wave form C to have two transitions and flux changes per bit. The packing density of a moving magnetic medium and therefore the capacity of the magnetic memory is limited by the number of flux changes per unit length. Thus, the bit packing density and the capacity of a memory can be doubled if the same data can be recorded with only half as many flux changes per unit length. Accordingly, the phase modulation signal C from Exclusive OR gate 10 is applied to flip-flop 12 which divides the phase modulation wave form C to produce the recording current as shown in wave form D. Flip-flop 12 may be a JK flip-flop with the J and K terminals connected to the clock input so that the flip-flop switches only when its input signal C drops from a "1" to "0." This modified phase modulation signal D is then applied to a write amplifier 14 and the signal is recorded by transducer 15.

The recorded signal is demodulated by first reading the magnetic medium with transducer 16 and applying the signal to read amplifier 17. Read amplifier 17 contains the necessary circuitry well known in the art to convert the current signal from transducer 16 into a square wave output, as illustrated in wave form D of FIG. 2. This signal is then introduced to an edge detector 18 which senses all transitions of the read amplifier signal D and produces a series of very narrow pulses E corresponding to those signal transitions. To distinguish very narrow pulses from pulses having a significant width, the very narrow pulses will be referred to as spikes. Hence, edge detector 18 generates spikes E corresponding to the transitions of pulses D.

In order to reconstruct the wave form of the original input data, it is first necessary to generate a new clock signal that is identical with signal B of FIG. 2, but which will be phased differently in order to cooperate with the spikes E. The self-clock generating circuit includes a voltage controlled oscillator 20 which may operate at a frequency approximately equal to eight times that of the master clock frequency of wave form B. The output of oscillator 20 is applied to a "divide by eight" circuit 22 which may be comprised of a series of flip-flops and which produces at its output a frequency that roughly corresponds to the frequency of the master clock. The output of circuit 22 is then introduced, along with the master clock signal B, to a phase detector 24 which detects any differences in the phase between the divide circuit 22 and the master block B and produces an error signal that is proportional to the difference. This error signal is supplied through a low pass filter 26 to the voltage controlled oscillator 20 which is readjusted by the error signal to generate an output which is precisely eight times the frequency of the master clock as illustrated in the wave form F of FIG. 2.

The high-frequency output of oscillator 20 is applied to a four-bit binary counter 28 which produces at its four outputs G, H, J, and K signals that are, respectively, twice, four times, eight times, and sixteen times the pulse length of the high frequency signals from oscillator 20. Since oscillator 20 produces signals that are eight times the frequency of the master clock signal B, or in other words, one eighth the pulse length of the master clock pulses, the output of four-bit counter 28 would be respectively equal to one quarter, one half, equal to, and twice the pulse length of the master clock signal, B. As illustrated in FIG. 1, the output of the edge detector 18 is coupled to the reset terminal of the counter 28 so that the spikes E will, when they occur, reset the counter to "0."

The purpose of the counter 28 is to obtain narrow output pulses having pulse widths equal to those of signal F and occurring at periods of one-quarter, three-quarters, one and one-quarter, and one and three-quarters bit time. Accordingly, the output of the counter is coupled into a decoding matrix which may include each of the four outputs of the counter as well as the inverted four outputs. To obtain the actual bit lengths indicated above, it is not necessary to obtain the inverted output of the first bit nor the true output of the second bit. The one quarter pulse L, that is, the first pulse generated one quarter of a bit time after the counter 28 has been reset, is obtained from an AND gate 30 having five inputs coupled to receive the signal F from oscillator 20, the first count G from counter 28, and the inverted second, third, and fourth counts, $\overline{H}$, $\overline{J}$, and $\overline{K}$, respectively. Similarly, the three-quarter pulse M is obtained from AND gate 32 which is coupled to receive the signals F, G, $\overline{H}$, J, and $\overline{K}$. The one and one-quarter pulse N is obtained through AND gate 34 which is coupled to receive signals F, G, $\overline{H}$, $\overline{J}$, and K. The one and three-quarter pulse P is obtained from AND gate 36 which is coupled to receive signal F, G, $\overline{H}$, J, and K.

In the event a spike E from edge detector 18 occurs during the binary count, the counter 28 is instantly reset to assure that spikes E are timed-sychronized with the output of the counter as the various counts proceed. FIG. 2 illustrates that the counts L, M, N, and P progress through one cycle when a spike E represented by the numeral 38 occurs. In this particular instance, spike 38 and subsequent spike 39 occurred to reset the counter at the end of its normal count; however, the next subsequent spike 40 is seen to occur when counter 28 has progressed only through a portion of its normal cycle. The occurence of pulse 40 therefore resets the counter to "0" and also assures that the new count is synchronized with the occurence of the spike.

Gates 30, 32, 34, and 36 are coupled to the input of an OR gate 42, which produces a series of output spikes Q, the spacing of which corresponds to one half cycle of clock time. In order to generate a self-clocking signal, these spikes Q are applied to a flip-flop 44 which is preferably a JK flip-flop with the J and K terminals connected to the input clock terminal so that the flip-flop will change state coincidently with the arrival of each input spike Q.

It is important that flip-flop 44 produce a properly phased output signal, otherwise there will be an erroneous reconstruction of the original data input signal at the output terminal of the demodulator. Therefore, flip-flop 44 must be forced into its low state at the appropriate time at the beginning of recording of each data block. When a data block is to be recorded, it is first necessary to apply a "clear" signal, which may be two or three data bits in length, to one input terminal of an AND gate 46, the second input terminal of which is connected to the output of AND gate 34. It can now be understood why it is necessary to provide a preamble such as a "1" followed by a "0" before the data information is recorded into the system. A preamble of a "1" and "0" assures the presence of a spike in the proper position in the train of spikes N which when gated with the "clear" signal in AND gate 46, produces an output signal to the reset terminal of flip-flop 44. This signal at the reset terminal forces the flip-flop into its low or false state at a point corresponding to the presence of the first spike N from AND gate 34. Therefore, the first transition in the output signal S of flip-flop 44 is a downward going signal corresponding to the spike that was generated as a result of the preamble signal originally applied to the input data terminal of gate 10.

The properly phased self-clock output pulses S generated in flip-flop 44 are applied to AND gate 47 along with the spikes E from edge detector 18 to produce output spikes T. It will be noted in comparing the spikes E and self-clock S that the spikes E always appear near the center or peak of the self-clock wave form S, and not near a transition point. This is, of course, due to the fact that the self-clocking signal was generated from spikes L, M, N, and P that are generated at the odd quarter-bit points following the spikes E. It will also be noted that some of the spikes E are not carried down to the output spikes T because they failed to pass through AND gate 46 at the proper self-clock timing position.

Output spikes T produced by AND gate 47 are applied to the input terminal of a retriggerable monostable multivibrator 48 which has been preadjusted to switch at one bit time. Accordingly, upon the arrival of each input spike, multivibrator 48 produces a data output pulse of one bit length. It will be noted that the data output pulse of FIG. 2 corresponds precisely with the input data wave form A less the preamble bits "1" and "0." The circuitry has faithfully reproduced the original input data after having divided the signal at flip-flop 12 so that the recorded data contained no more than one flux change per bit. It can, therefore, be appreciated that the recorded data in wave form D can be stored at twice the bit density of the original input data in wave form A. Such an increased density doubles the storage capacity of the magnetic memory.

What is claimed is:

1. In a digital recording and reconstruction circuit of the type comprising:

gating means responsive to a master clock signal and a binary data input signal for generating a first alternating signal having a cycle of one phase representing a binary "1" and a cycle of the opposite phase representing a binary "0;"

dividing means coupled to said gating means and responsive to said first alternating signal for generating a second alternating signal having a frequency of one-half that of said first alternating signal;

said second alternating signal having midbit transitions representing a binary "1," and transitions at the beginning of bits between contiguous binary "0's" of the input signal representing a binary "0;"

recording means for recording and for reading and shaping said second alternate signal;

an edge detector coupled to the output of said recording means and responsive to said second alternate signal for producing data spike signals at points corresponding in time to the edges of said shaped second alternate signal;

clock circuitry coupled to said edge detector and responsive to the data spike signals for generating a self-clocking signal having a frequency corresponding to said master clock signal;

gating circuitry coupled to said clock circuitry and to said edge detector for producing output spike signals when the polarity of said self-clocking signal corresponds to that of the data spike signals; and pulse generating means coupled to said gating circuitry for generating output pulses of one bit in width upon receipt of each output spike signal;

the improvement being in the said clock circuitry which comprises:

generating means for producing recurring pulses at a frequency that is a multiple of said master clock signal frequency;

a binary counter coupled to said generating means for producing output signals having pulse widths that are twice, four times, eight times, and sixteen times the width of the pulses produced by said generating means;

gating means coupled to receive selected output signals from said binary counter and the recurring pulses from said generating means for producing output pulses having widths of one-quarter, three-quarters, one and one-quarter, and one and three-quarters of one cycle of said master clock signal; and a flip-flop coupled to the output of said gating means said flip-flop adapted to change state upon the arrival of each output signal from said gating means for generating a substantially square wave clocking signal corresponding to said master clock signal.

2. The clock circuitry claimed in claim 1 wherein said generating means comprises:

an oscillator for producing output pulses at a frequency that is substantially a multiple of said master clock frequency;

a frequency divider coupled to said oscillator for dividing the output frequency thereof to produce an output signal that is substantially equal to said master clock frequency; and comparison circuitry coupled to receive said master clock signal and the output signal of said frequency divider for producing an error signal indicative of difference in phases between said master clock signal and said frequency divider output signal, said error signal being applied to said oscillator to adjust the frequency thereof.

3. The clock circuitry claimed in claim 2 wherein said oscillator is a voltage controlled oscillator adapted to operate at a frequency of eight times that of the frequency of said master clock signal.

4. The clock circuitry claimed in claim 3 further including means coupled to the reset terminal of said flip-flop and responsive to an externally applied clearing signal and the output of one said gating means for forcing said flip-flop into a predetermined phase for generating clocking signals.

* * * * *